United States Patent [19]

Takahashi et al.

[11] Patent Number: 5,011,714
[45] Date of Patent: Apr. 30, 1991

[54] METHOD OF APPLYING A LIQUID TO A MOVING WEB

[75] Inventors: Shinsuke Takahashi; Norio Shibata; Tsunehiko Sato, all of Kanagawa, Japan

[73] Assignee: Fuji Photo Film Co., Ltd., Kanagawa, Japan

[21] Appl. No.: 541,674

[22] Filed: Jun. 21, 1990

Related U.S. Application Data

[62] Division of Ser. No. 491,991, Mar. 12, 1990.

[30] Foreign Application Priority Data

Mar. 16, 1989 [JP] Japan .................................. 1-62274

[51] Int. Cl.$^5$ .......................... H01F 10/02; B05D 1/18
[52] U.S. Cl. .................................. 427/434.3; 427/128
[58] Field of Search .............................. 427/128, 434.3

Primary Examiner—Bernard Pianalto
Attorney, Agent, or Firm—Sughrue, Mion, Zinn, Macpeak & Seas

[57] ABSTRACT

A method and apparatus for coating a magnetic liquid onto a moving substrate to form a magnetic recording medium having an improved product yield and reduced streaking. Coating liquid is fed to an extruder by a second pump, while excess coating liquid is extracted from the extruder and returned to a storage tank with a second pump. When the coating operation is to be stopped, the extruder is bypassed between the first and second pumps and a portion of the output from the first pump is returned directly to the storage tank so that the flow rates through both pumps are the same during coating and idling times.

3 Claims, 3 Drawing Sheets

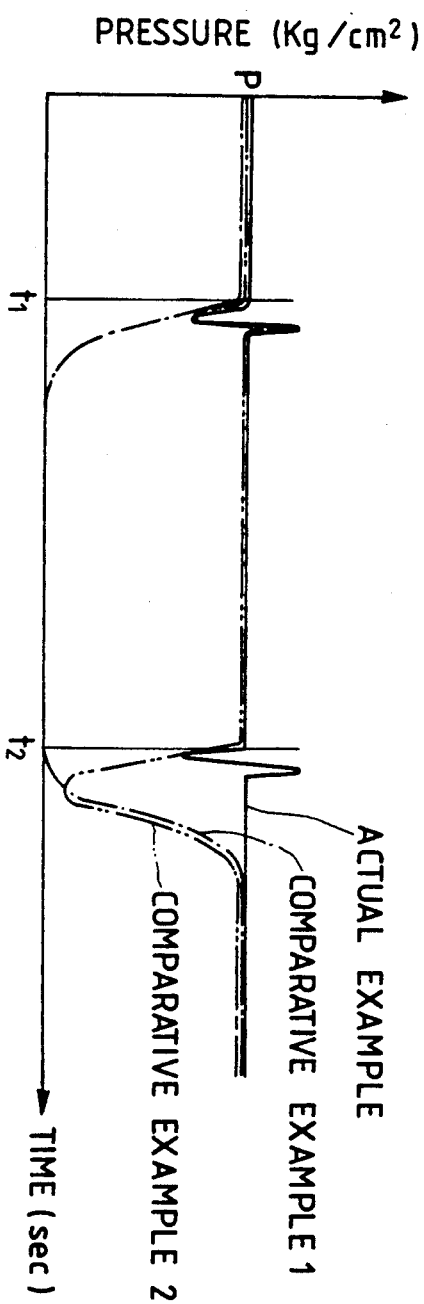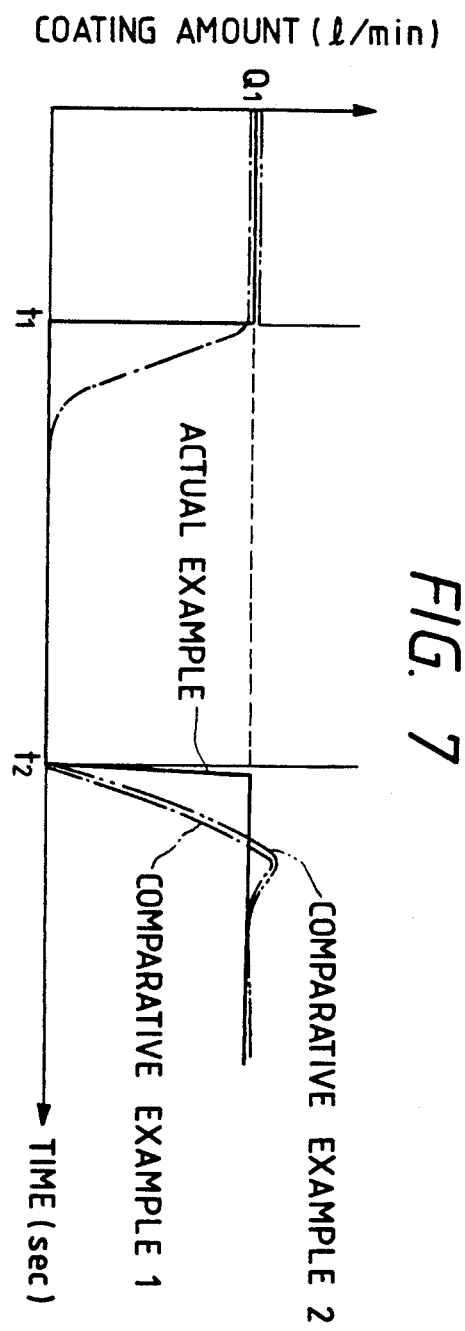

METHOD OF APPLYING A LIQUID TO A MOVING WEB

This is a divisional of application Ser. No. 491,991, filed Mar 12, 1990.

BACKGROUND OF THE INVENTION

The present invention relates to a method and apparatus for manufacturing a magnetic recording medium, and particularly to a method for applying a magnetic liquid to a long wide carrier for manufacturing a magnetic recording medium.

Magnetic recording media of the so-called application type are generally manufactured by applying a liquid in a desired thickness to the surface of a nonmagnetic flexible band-like web moving continuously in a prescribed direction, and then drying the liquid on the web. As a result, a magnetic recording medium of the application type is quite different in manufacturing method from a magnetic recording medium of the nonapplication type manufactured using ion plating, sputtering, vacuum evaporation coating or the like. The majority of magnetic recording media for audio, video and data processing uses are manufactured using an application method.

Although an application method of the gravure type, an application method of the reverse roller type, an application method of the doctor blade type or the like can be used to manufacture a magnetic recording medium of the application type, an application method of the extrusion type is more often used because the latter provides a product of greater stability and lower cost. In a conventional application method of the extrusion type, as disclosed, for example, in Japanese Unexamined Published Patent Application No. 117669/87, a changeover valve is provided immediately upstream of an extruder used to apply the coating liquid so as to switch the passage for the liquid being applied to selectively return the liquid to a storage tank. That is, before the liquid is applied to a web, the extruder is filled with the liquid and the changeover valve is set to return a prescribed quantity of the liquid to the storage tank under conditions similar to those as occur during the actual application time. Thereafter, the changeover valve is set to start or resume the supply of the liquid to the extruder to perform application of the liquid.

In this apparatus, at the time of starting application of liquid to the web, or when resuming application of liquid after temporarily stopping the same due to some trouble, the quantity of liquid applied to the web can be equalized to a prescribed value in a relatively short time so as to decrease the amount of waste product and thereby to enhance the production yield.

However, with such conventional application methods, it is difficult to obtain further improvements in the quality of the product and to greatly increase the speed of application of the liquid to thus further increase productivity.

There are various reasons why it is difficult to increase the speed of application. The primary reason is that the thickness of the web is very small and the liquid to be applied to form a ferromagnetic layer has a thixotropic property, which greatly affects the electromagnetic converting properties of the product. Further, in the case where the overall passageway for the liquid to be applied has a relatively large number of places where the liquid can stagnate, the liquid is likely to undergo an abnormal rise in viscosity or cohere due to the thixotropic property of the liquid, thus greatly changing the electromagnetic converting property of the ferromagnetic layer. In a conventional application device of the extrusion type, the liquid is more likely to cohere in the liquid reservoir of the extruder of the device opposite a liquid feed port for the reservoir as the quantity of the liquid discharged from the slit of the extruder is decreased. Cohesion of the liquid results in the formation of a large number of longitudinal streaks in the layer of the applied liquid on the web. If the quantity of liquid discharged from the slit of the extruder is increased, the number of longitudinal streaks tends to become smaller, but non-uniformities in the thickness of the layer of the applied liquid on the web tend to spread to the entire width of the liquid-applied portion of the web.

It is believed that the distribution of the flow speed of the liquid in the reservoir in the longitudinal direction of the extruder strongly affects the thixotropic property of the liquid. More specifically, the liquid in the reservoir near the liquid inlet side thereof, at which the flow speed of the liquid is relatively high, receives a shearing action so that the viscosity of the liquid is likely to drop, thereby resulting in non-uniformity in the thickness of the layer of the applied liquid on the web. The liquid in the reservoir at the liquid outlet side of the extruder, where the flow speed of the liquid drops to nearly zero, is likely to cohere and cause longitudinal streaks in the layer of the applied liquid on the web.

In view of the above, the present inventors have previously proposed an improved application method and disclosed the same in Japanese Patent Application No. 63601/88. In that method, a liquid is continuously discharged through the slit of an extruder which faces the surface of a continuously moving web so that a thin layer of the applied liquid is formed on the surface of the web. The method is characterized in that a quantity of the liquid larger than that applied to the web is supplied to the liquid reservoir of the extruder, which communicates with the slit thereof, and a portion of the liquid in the reservoir is forcibly withdrawn through an external drain port located at or near the end of the reservoir opposite the feed port therefor along the length of the extruder or the width of the web.

This method overcomes problems such as it being difficult to precisely set the quantity of liquid applied to the web and the quantity thereof withdrawn through the drain port due to factors such as the shape of the extruder, the physical properties of the liquid and the configuration of the liquid feed passage. Thus, the amount of non-uniformity in the thickness of the layer of the applied liquid on the web and the number of longitudinal streaks in the layer are reduced, and as a result the electromagnetic properties of the magnetic layer formed on the web are improved.

Enhancement of the yield of the product and improvement of the quality thereof are conventionally attained by mutually different methods, as described above. However, it is desired to achieve both an enhancement of yield and improvement in quality simultaneously. Using the conventional methods, however, enhancement of yield and improvement in quality could not be simultaneously attained by a combination of the two methods due reasons which will now be explained.

In the case where the methods disclosed in the abovementioned Japanese Patent Applications are combined with each other, a liquid extraction pump provided at the drain port of the extruder must remain stopped while the changeover valve provided immediately upstream of the extruder is operated so that the liquid supplied from the storage tank is all returned to the tank through a liquid return passage before the application of the liquid to the web is started. When the changeover valve is operated to start the supply of the liquid to the extruder, the liquid extraction pump is driven. However, the quantity of liquid withdrawn from the reservoir by the extraction pump does not stabilize until the rotational speed of the pump stabilizes. For that reason, it has not been possible to obtain an improvement in the yield of the product, such as could be attained by the method disclosed in the above-mentioned Application No. 117669/87. Instead, incomplete portions of the product are significantly increased, especially in the case where the layer of the applied liquid on the web is very thin, as has been the recent trend.

SUMMARY OF THE INVENTION

The present invention was made in order to solve the above-mentioned problems.

Accordingly, it is an object of the present invention to provide a method and apparatus for applying a liquid to a web so that a magnetic recording medium, having a good yield and improved in qualities such as the electromagnetic conversion efficiency, can be stably manufactured with a high productivity and in such a manner as to prevent longitudinal streaking in the layer of applied liquid on the web and non-uniformities in the thickness of the applied layer under a wide range of manufacturing conditions.

The above and other objects of the invention are met by an apparatus for applying a liquid to a surface of a moving web comprising an extruder having an inlet for receiving a coating liquid, an extrusion slit for applying coating liquid to a web, and an outlet for discharging excess coating liquid received through the inlet but not coated on the web, a liquid storage tank for holding a supply of the coating liquid, first pump means for pumping coating liquid from the tank to the inlet of the extruder, first and second return passages for returning excess coating liquid to the tank, second pump means for pumping excess coating liquid from the extruder outlet back to the tank through the first return passage, a bypass passage connected to the second return passage, and valve means connected to the inlet and outlet of the extruder and the second return passage. The valve means has a first position wherein all liquid from the first pump means is passed to the inlet of the extruder wherein a first quantity of coating liquid is coated on the web and a second quantity of coating liquid is discharged from the outlet and pumped by the second pump means through the first return passage to the tank, and a second position wherein a quantity of coating liquid equal to the first quantity is passed through the second return passage to the tank and a quantity of coating liquid equal to the second quantity is passed to the second pump means through the bypass passage without passing through the extruder and returned to the tank, wherein quantities of coating liquid pumped by the first and second pump means are equal for the two positions of the valve means.

The above and other objects of the invention are met by a method for applying a liquid to a moving web with an extruder apparatus including an extruder, a first pump for pumping coating liquid from a storage tank to an inlet of the extruder, and a second pump for returning excess coating liquid from the extruder to the tank, including a first step of simultaneously pumping a first quantity of coating liquid from the tank with a first pump, returning a second quantity of coating solution from the first pump to the tank, and passing a third quantity of coating liquid from the first pump to the second pump, bypassing the extruder, thence returning the third quantity to the tank, and a subsequent second step of simultaneously pumping the first quantity of coating liquid from the tank to the inlet of the extruder, coating the second quantity of coating liquid with the extruder on the moving web, and returning the third quantity of coating liquid from the extruder to the liquid storage tank with the second pump.

The above and other objects of the invention are met by a method for applying a liquid to a moving web with an extruder apparatus including an extruder, a first pump for pumping coating liquid from a storage tank to an inlet of the extruder, and a second pump for returning excess coating liquid from the extruder to the tank, and first and second three-way valves for controlling flow passages of the coating liquid, comprising the steps of setting the first and second three-way valves to first positions thereof to connect an outlet of the first pump to the inlet of the extruder with the first valve and the outlet of the extruder to the second pump with the second valve to thereby simultaneously coat the web with a first quantity of coating liquid extruded through a slit in the extruder and return a second quantity of coating liquid to the tank from an outlet of the second pump, and subsequently substantially simultaneously setting the first and second valves to second positions thereof to return the first quantity of coating liquid from the outlet of the first pump to the tank with the first valve and to bypass the second quantity of coating liquid around the extruder with the first and second valves and return the second quantity of coating liquid to the tank from the outlet of the second pump, wherein the first and second pumps each pump equal quantities of coating liquid for both the first and second positions of the valves.

BRIEF DESCRIPTION OF THE DRAWINGS

FIG. 7 is a graph indicating changes in the quantity of an applied liquid; and

FIG. 8 is a graph indicating changes in the pressure of the applied liquid.

DESCRIPTION OF THE PREFERRED EMBODIMENTS

Preferred embodiment of the present invention will hereafter be described in detail with reference to the attached drawings.

Figure 1:
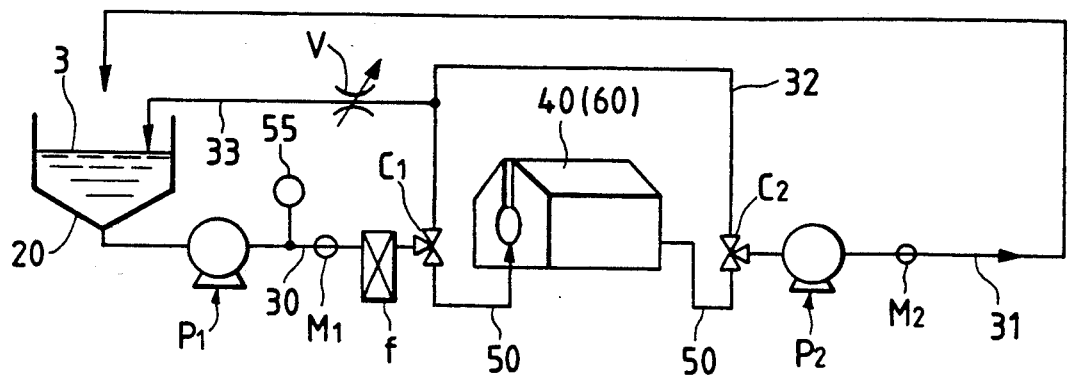
FIG. 1 is a schematic diagram of a coating liquid applying apparatus constructed in accordance with a preferred embodiment of the present invention.
Figure 2:
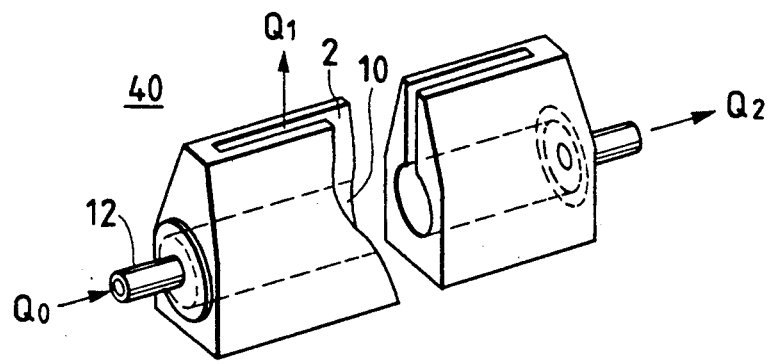
FIG. 2 is a perspective view of an extruder which may be used in the liquid applying apparatus of FIG. 1.
Figure 3:
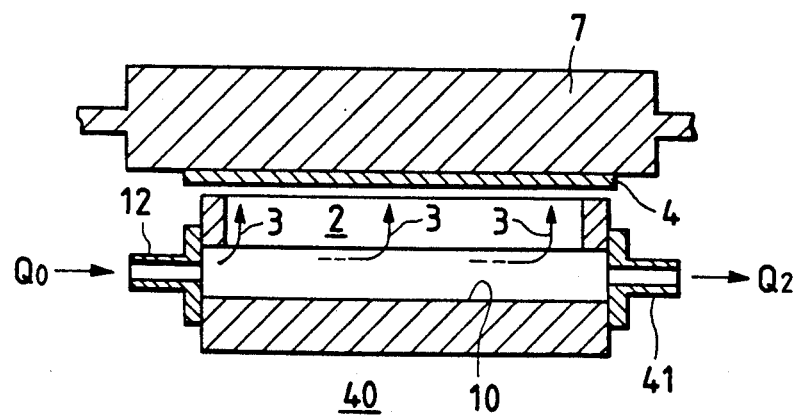
FIG. 3 is a sectional view of the extruder of FIG. 2.

FIG. 1 is a schematic view of a liquid passage system for applying a liquid 3 to a web in accordance with a liquid applying method and apparatus of the present invention. FIGS. 2 and 3 show an extruder 40 for applying the liquid. The extruder 40 is disposed so that the outside portion of the slit 2 of the extruder vertically faces the surface of the web 4 upward across a small gap of 2 mm to 5 mm. The web 4 is moved at a prescribed speed while being supported by a backing roller 7.

When the liquid 3 is being continuously applied to the web 4, the liquid is continuously supplied through a liquid feed passage 30 by a liquid feed pump $P_1$ so that the supplied quantity $Q_0$ of the liquid from a liquid feed nozzle 12 to a liquid reservoir 10, which extends in the direction of width of the web, is larger than the quantity $Q_1$ of the liquid applied to the surface of the web 4. The distribution of the pressure of the liquid 3 in the reservoir 10 is thus made nearly uniform in the direction of width of the web 4. The excess portion of the liquid 3 in the reservoir 10 is forcibly withdrawn therefrom by a liquid extraction pump $P_2$ through a liquid drain nozzle 41 provided at the end of the reservoir opposite the liquid feed nozzle 12 along the width of the web 4.

Figure 4:
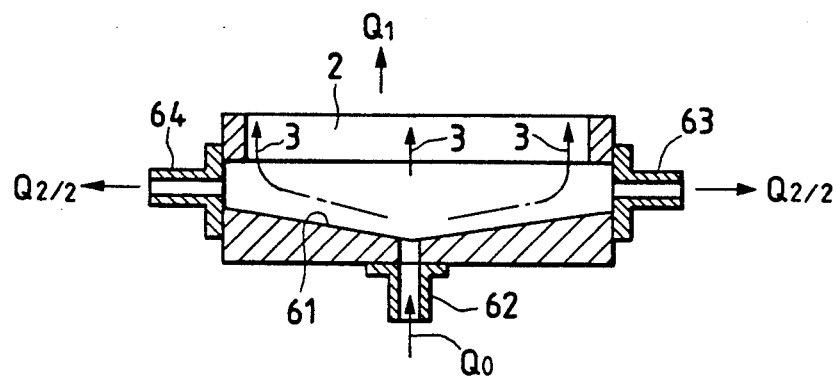
FIG. 4 is a sectional view of another extruder which may be used in the liquid applying apparatus of the invention.

The extruder 60 shown in FIG. 4 is a modification of that shown in FIG. 2 and 3, and slightly differs from the latter in the position of the liquid feed nozzle and the form of the liquid reservoir. The extruder 60 is of the central feed type in which the liquid feed nozzle 62 thereof is located nearly at the center of the length of the extruder so that the layer of the liquid 3 applied on the web is less likely to suffer longitudinal streaking and non-uniformities in the thickness of the applied layer than in the case of the above-described extruder 40 of the lateral feed type.

Longitudinal streaking and non-uniformities in the thickness of the applied layer, which would make the electromagnetic conversion efficiency of the product nonuniform, are more likely to occur at the center and both ends of the length of the liquid reservoir 61 whose depth decreases from the center toward both the ends. However, because liquid drain nozzles 63 and 64 are provided at both ends of the liquid reservoir 61 to forcibly drain a portion of the liquid 3 from the reservoir, the quality of the product is made uniform along the width thereof.

In some cases the liquid drain nozzles 41, 63 and 64 need not be provided at the ends of the liquid reservoirs 10 and 61, but may be constituted by passages extending to the liquid reservoirs through the bodies of the extruders 40 and 60 near the ends thereof.

Each of the extruders 40 and 60 may be disposed to vertically face the web 4 either upward or downward.

The outside portion of the slit 2 of each of the extruders 40 and 60 may be located near the portion of the surface of the web 4, which is off the backing roller 7 to hold the web 4 at a small distance from the outside portion of the slit by the pressure of the liquid 3 being applied to the web.

The method of application with the extruder 40 or 60 will now be described in detail.

The liquid 3 is pumped from a liquid storage tank 20 toward the extruder 40 or 60 by the liquid feed pump $P_1$ through a passage which can be appropriately switched between a main passage 50 or a bypass 32 by a three-way valve $C_1$, which is a first changeover valve, provided immediately upstream to the extruder. A return passage 33 is branched from the bypass 32 through which the liquid 3 can be returned to the storage tank 20. A control valve V for regulating the flow rate of the liquid 3 is provided in the return passage 33. A three-way valve $C_2$, which is a second changeover valve and is operated nearly synchronously with the three-way valve $C_1$, is provided immediately downstream of the extruder 40 or 60 and upstream of the extraction pump $P_2$. The liquid 3 extracted from the reservoir 10 or 61 of the extruder 40 or 60 by the extraction pump $P_2$ is returned to the storage tank 20 through a final return passage 31.

Before application of the liquid 3 to the web 4 is started, the liquid is filled into the extruder 40 or 60. The three-way valves $C_1$ and $C_2$ are then operated nearly synchronously with each other by electric signals as the liquid feed pump $P_1$ and the liquid extraction pump $P_2$ are kept in action so that the liquid 3 is caused to flow through the bypass 32 and the return passage 33. The degree of opening of the control valve V is adjusted so that the flow rates of the liquid 3 in the bypass 32 and in the return passage 33 are appropriately set. Specifically, the flow rate of the liquid 3 in the bypass 32 is set to correspond to the flow rate $Q_2$ of the liquid flowing through the liquid drain nozzle 41 or the liquid drain nozzles 63 and 64 at the time of application of the liquid to the web 4. The flow rate of the liquid 3 in the return passage 33 is set to correspond to the flow rate $Q_1$ of the liquid flowing through the slit 2 at the time of application of the liquid to the web 4. The liquid 3 is thus supplied under nearly the same conditions before the start of application to the web as after the start.

To start the application of the liquid 3 to the web 4, the three-way valves $C_1$ and $C_2$ are operated substantially at the same time so that the liquid is supplied to the extruder 40 or 60. The three-way valve $C_2$ may be operated slightly after the other three-way valve $C_1$. Since the application of the liquid 3 to the web 4 is started as described above, the flow rate of the liquid discharged from the slit 2 of the extruder 40 or 60 reaches a prescribed value substantially instantaneously. The time from the switching of the main passage 50 to the bypass 32 by the operation of the three-way valves $C_1$ and $C_2$ to the start of the application of the liquid 3 to the web and time from the preparatory supply of the liquid to the extruder 40 or 60 to the start of the application are so short that the cohesion of the liquid in the extruder is negligible. For this reason, even if the web 4 is very rapidly moved so that the liquid 3 is applied thereto at a high rate, the areas of the web where the liquid 3 is not applied or incompletely applied at the time of the start or resumption of application of the liquid 3 are very much reduced.

When the liquid 3 is supplied from the storage tank 20 to the extruder 40 or 60 by the liquid feed pump $P_1$, the flow rate of the liquid is measured by a flow meter $M_1$ and sent to the extruder through a filter f. Simultaneously, a portion of the liquid 3 in the extruder is extracted therefrom through the liquid drain nozzle 41 or the liquid drain nozzles 63 and 64 by the extraction pump $P_2$, and the flow rate of the liquid 3 is then measured by a flow meter $M_2$. The flow rate $Q_1$ of the liquid 3 discharged from the slit 2 of the extruder 40 or 60 is equal to the difference $Q_0-Q_2$ between the flow rates $Q_0$ and $Q_2$ measured by the flow meters $M_1$ and $M_2$. In other words, the liquid 3 is applied at a flow rate $Q_1=Q_0-Q_2$ to the web 4.

It is preferable that the supply and extraction of the liquid 3 by the liquid feed pump $P_1$ and the liquid extraction pump $P_2$ be smooth and stable. The pumps $P_1$ and $P_2$ may be of any type. For instance, the extraction pump $P_2$ may be a liquid circulation pump or any other liquid moving device as far as it functions to pump the liquid 3 from the reservoir 10 or 61 through the liquid drain nozzle 41 or the liquid drain nozzles 63 and 64.

Since the flow rate of the liquid 3 discharged from the slit 2 of the extruder 40 or 60 can be controlled by the extraction pump $P_2$, the quantity $Q_1$ of the liquid applied to the web 4 can be stably regulated over a wide range in which longitudinal streaking and non-uniformities in the thickness of the layer of the applied liquid on the web 4 are unlikely to occur in the coated layer. In other words, the extraction pump $P_2$ functions to make uniform the flow rate of the liquid 3 through the reservoir 10 or 61 and to suppress fluctuations in the pressure of the liquid in the reservoir as well as to prevent excessive pressure in the liquid, thus to maintain highly effective flow properties of the liquid and to stabilize the behavior of the liquid discharged from the slit 2.

Since the operating conditions of the feed pump $P_1$ and the extraction pump $P_2$ can be changed as the flow rate $Q_1$ of the liquid 3 to be applied to the web 4 remains fixed, the state of supply of the liquid to the extruder 40 or 60 can be altered as the flow rate $Q_1$ remains fixed. For this reason, the degree of freedom of establishing the application conditions is high.

Although the flow rate control valve V for the liquid 3 is provided in the return passage 33 in the above-described embodiment, the present invention is not limited thereto, but may be otherwise practiced by providing the valve in the bypass 32, or by providing valves in the bypass 32 and the return passage 33.

In the application apparatus and method provided in accordance with the present invention, a quantity of a liquid which is larger than that of the liquid to be applied to a web is supplied to the liquid reservoir of an extruder, and the excess portion of the liquid is forcibly extracted from the reservoir through a drain port provided at an appropriate portion of the reservoir. A bypass connected to changeover valves provided immediately upstream and downstream to the extruder and a return passage branched from the bypass are provided. Before the application of the liquid to the web is started, the liquid is filled in the extruder while being regulated by a flow rate control valve provided in at least one of the bypass and the return passages. A liquid feed pump and a liquid extraction pump are then kept in action so that the liquid is supplied to the bypass under nearly the same supply conditions before the start of the application as after the start. The changeover valves are then shifted to supply the liquid to the extruder to start the application of the liquid to the web.

Accordingly, two effects which cannot be produced in a conventional method and apparatus are simultaneously attained by the present invention.

First, the quantity of liquid applied to the web can be set by controlling the flow rate of the liquid being supplied to the extruder and the flow rate of the liquid being extracted therefrom. For example, the flow rate of the liquid in the whole liquid passage system for the application can be altered as the difference between the flow rate of the supplied liquid to the extruder and that of the taken-out liquid therefrom is maintained at a desired value. The range of selection of the flow conditions of the liquid in the overall liquid passage system is thus widened. Moreover, the flow rate of the liquid in the extruder is made uniform to therefore stabilize the physical properties of the liquid, for instance, its viscosity, flow properties, and the like. As a result, longitudinal streaking and non-uniformities in the thickness of the layer of applied liquid on the web are less likely to occur in the applied layer.

Secondly, the flow rate of the liquid discharged from the slit of the extruder to the web reaches a desired value instantaneously at the start of application of the liquid to the web. For this reason, even if the web is very rapidly moved so that the liquid is applied thereto at a great rate, the areas of the web which are not coated or which are nonuniformly coated, and which would be waste product, are very significantly reduced.

The effects of the invention will be clarified through the comparison of an actual example of a preferred embodiment of the present invention with comparative examples of embodiments of conventional methods and apparatuses.

ACTUAL EXAMPLE

Substances whose quantities are shown in Table 1 were put in a ball mill and well mixed and dispersed together. Afterwards, 30 parts by weight of an epoxy resin whose epoxy equivalent was 500 were added to the mixed substances and uniformly mixed and dispersed therewith so that a magnetic liquid to be applied was obtained.

TABLE 1

| | |
|---|---|
| $\gamma$-$Fe_2O_3$ powder (spicular grains of 0.5 $\mu$m in average major diameter and 320 Oe in coercive force) | 300 parts by weight |
| copolymer of vinyl chloride and vinyl acetate (87:13 in copolymerization ration and 400 in polymerization degree) | 30 parts by weight |
| electroconductive carbon | 20 parts by weight |
| polyamide resin (300 in amine value) | 15 parts by weight |
| lecithin | 6 parts by weight |
| silicone oil (dimethyl polysiloxane) | 3 parts by weight |
| xylol | 300 parts by weight |
| methylisobutyl ketone | 300 parts by weight |
| n-butanol | 100 parts by weight |

Measuring the equilibrium viscosity of the magnetic liquid with Shimadzu rheometer RM-1 manufactured by Shimadzu Corp., the reading of the rheometer was 7 poise at a shearing speed of 10 sec$^{-1}$.

The magnetic liquid was applied to a web made of a polyethylene terephthalate film, using an apparatus as shown in FIG. 1, 2 and 3, under application conditions shown in Table 2.

TABLE 2

| | |
|---|---|
| thickness of dried layer of applied liquid | 5 $\mu$m |
| thickness of web | 20 $\mu$m |
| width of web | 200 mm |
| speed of application | 200 m/min |
| gap between web and slit | 3 mm |
| width of slit | 0.5 mm |
| direction of discharge from nozzle | perpendicular |
| diameter of liquid reservoir | 15 mm |
| supplied liquid quantity $Q_0$ | 8 l/min |
| applied liquid quantity $Q_1$ | 4 l/min |
| drained liquid quantity $Q_2$ | 4 l/min |

When application of the magnetic liquid was being performed under the above conditions, the three-way valves $C_1$ and $C_2$ were operated so that the supply of the magnetic liquid to the extruder 40 was temporarily stopped, as indicated at liquid supply stop points $t_1$ in FIG. 7 and 8. The valves $C_1$ and $C_2$ were thereafter reversely operated so that application of the liquid was resumed, as shown at liquid supply resumption points $t_2$ in FIG. 7 and 8. This procedure was carried out five times. The results of the application are shown in FIG. 7 and 8 and Table 3 below. The flow rate shown in FIG. 7 was measured by using the flow meters $M_1$ and $M_2$. The pressure of the magnetic liquid to be applied to the web was measured by a pressure gauge 55.

COMPARATIVE EXAMPLE 1

Figure 5:
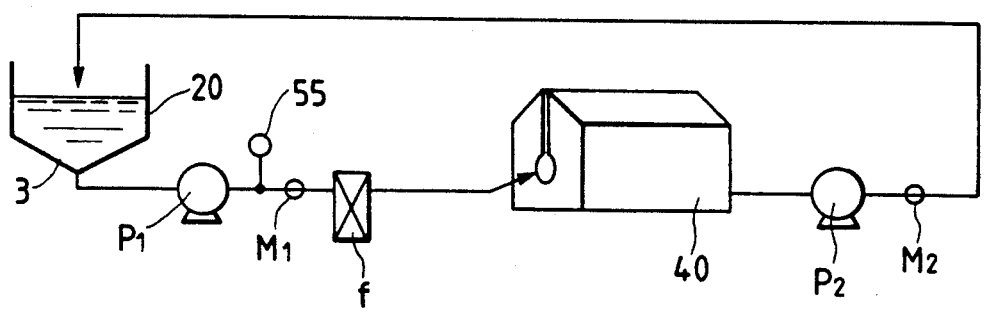
FIG. 5 is a schematic view of a conventional liquid applying device.

Using the application method disclosed in Japanese Unexamined Published Patent Application No. 63601/88, the same type of magnetic liquid was applied to the same type of web as in the Actual Example above using an apparatus as shown in FIG. 5 and under the application conditions shown in Table 2. When the application was being performed, the liquid feed pump $P_1$ and liquid extraction pump $P_2$ were operated so that the supply of the magnetic liquid to the extruder 40 was temporarily stopped, as shown at the liquid supply stop points $t_1$ in FIG. 7 and 8. The supply of the magnetic liquid to the extruder 40 was thereafter started again at the liquid supply resumption points $t_2$ indicated in FIG. 7 and 8. Such a procedure was carried out five times. The results of the application are shown in FIG. 7 and 8 and Table 3 below

COMPARATIVE EXAMPLE 2

Figure 6:
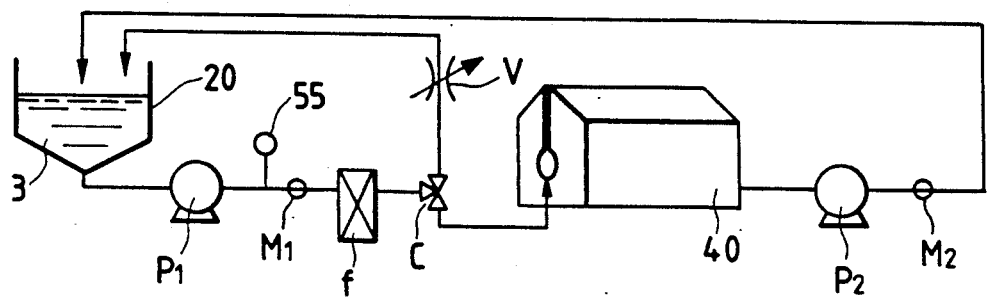
FIG. 6 is a schematic view of another conventional liquid applying device.

Using the application method disclosed in Japanese Unexamined Published Patent Application No. 117669/87, the same type of magnetic liquid was applied to the same type of web as in the Actual Example using an apparatus as shown in FIG. 6 and under the application conditions shown in Table 2. When the application was being performed, the liquid extraction pump $P_2$ and changeover valve $C_1$ were operated so that the liquid was returned to the liquid storage tank 20 of the apparatus through the return passage thereof and the supply of the liquid to the extruder 40 was temporarily stopped, as shown at the liquid supply stop points $t_1$ in FIG. 7 and 8. The liquid extraction pump $P_2$ and the changeover valve $C_1$ were thereafter operated to restart the supply of the liquid to the extruder 40 to resume application of the liquid, as shown at the liquid supply resumption points $t_2$ in FIG. 7 and 8. Such a procedure was carried out five times. The results of the application are shown in FIG. 7 and 8 and Table 3.

TABLE 3

| Example | average length of movement of web until applied quantity of liquid reached prescribed value |
|---|---|
| Actual Example | 3 m |
| Comparative Example 1 | 28 m |
| Comparative Example 2 | 24 m |

As can be readily understood from Table 3 and FIGS. 7 and 8, the response of the applied quantity and pressure of the magnetic liquid to the operation of the changeover valves the liquid supply stop point $t_1$ and to resumption of the supply of the liquid at the liquid supply resumption point $t_2$ in the Actual Example were quick. Especially, the length of the movement of the web which occurred after the valves $C_1$ and $C_2$ were changed over until the liquid reached a prescribed quantity applied to the web in the Actual Example was not larger than 15% of that in the case of Comparative Examples 1 and 2. In other words, the yield of the product in the case of the Actual Example was much greater than for products produced in the cases of the Comparative Examples.

Further, it was observed whether or not the layer of the applied magnetic liquid on the web suffered longitudinal streaking and non-uniformities in the thickness of the layer in each of the Actual Example and Comparative Examples 1 and 2. The results of the observation were generally good for each of the examples. However, the results of the observation were better for the Actual Example than for the Comparative Examples with regard to the liquid supply resumption point $t_2$.

What is claimed is:

1. A method for applying a liquid to a moving web with an extruder apparatus including an extruder, a first pump for pumping coating liquid from a storage tank to an inlet of said extruder, and a second pump for returning excess coating liquid from said extruder to said tank, comprising:

a first step of simultaneously pumping a first quantity of coating liquid from said tank with a first pump, returning a second quantity of coating solution from said first pump to said tank, and passing a third quantity of coating liquid from said first pump to said second pump, bypassing said extruder, thence returning said third quantity to said tank; and a subsequent second step of simultaneously pumping said first quantity of coating liquid from said tank to said inlet of said extruder, coating said second quantity of coating liquid with said extruder on said moving web, and returning said third quantity of coating liquid from said extruder to said liquid storage tank with said second pump.

2. The liquid applying method of claim 1, wherein said first step comprises controlling a flow rate of said coating fluid from said first pump to said tank to equal a flow rate of said coating liquid onto said web in said second step.

3. A method for applying a liquid to a moving web with an extruder apparatus including an extruder, a first pump for pumping coating liquid from a storage tank to an inlet of said extruder, and a second pump for returning excess coating liquid from said extruder to said tank, and first and second three-way valves for controlling flow passages of said coating liquid, comprising the steps of: setting said first and second three-way valves to first positions thereof to connect an outlet of said first pump to said inlet of said extruder with said first valve and said outlet of said extruder to said second pump with said second valve to thereby simultaneously coat said web with a first quantity of coating liquid extruded through a slit in said extruder and return a second quantity of coating liquid to said tank from an outlet of said second pump; and subsequently substantially simultaneously setting said first and second valves to second positions thereof to return said first quantity of coating liquid from said outlet of said first pump to said tank with said first valve and to bypass said second quantity of coating liquid around said extruder with said first and second valves and return said second quantity of coating liquid to said tank from said outlet of said second pump, wherein said first and second pumps each pump equal quantities of coating liquid for both said first and second positions of said valves.

* * * * *